United States Patent [19]
Hollins

[11] 3,954,147
[45] May 4, 1976

[54] POWER STEERING PUMP WITH AUXILIARY ELECTRIC MOTOR DRIVE

[76] Inventor: Jesse R. Hollins, 40 Stoner Ave., Great Neck, N.Y. 11021

[22] Filed: Oct. 3, 1974

[21] Appl. No.: 511,779

[52] U.S. Cl. ................................. 180/133; 60/405
[51] Int. Cl.² ............................................ B62D 5/06
[58] Field of Search ............... 180/79.2 R, 1 R; 60/405, 404

[56] References Cited
UNITED STATES PATENTS

| | | | |
|---|---|---|---|
| 3,414,734 | 12/1968 | Konrad | 180/1 R |
| 3,528,522 | 9/1970 | Turke | 180/79.2 R |
| 3,762,492 | 10/1973 | Ron | 60/405 |
| 3,820,620 | 6/1974 | Miller et al. | 60/405 X |
| 3,847,243 | 11/1974 | Barth | 60/405 |

Primary Examiner—Robert R. Song
Assistant Examiner—John A. Pekar
Attorney, Agent, or Firm—Bertram Ottinger; Bertram Frank; Peter T. Cobrin

[57] ABSTRACT

A power steering system for a motor vehicle. The power steering system includes a power steering pump which is belt driven by the motor vehicle crank shaft. An auxiliary electric motor is provided for driving the power steering pump when the motor vehicle engine is not running (as when stalled) and the ignition system is in the "ignition on" condition.

1 Claim, 4 Drawing Figures

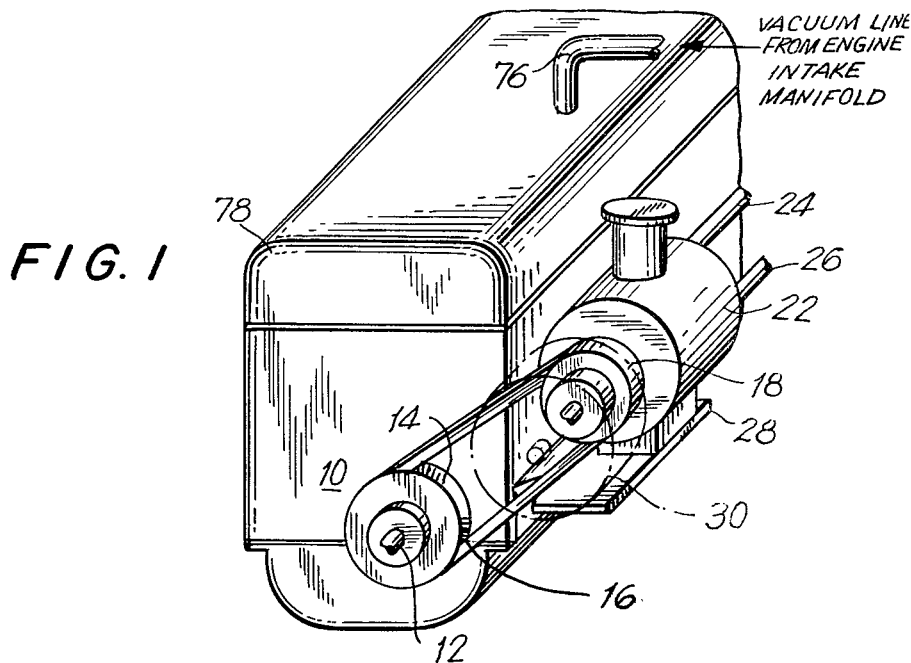
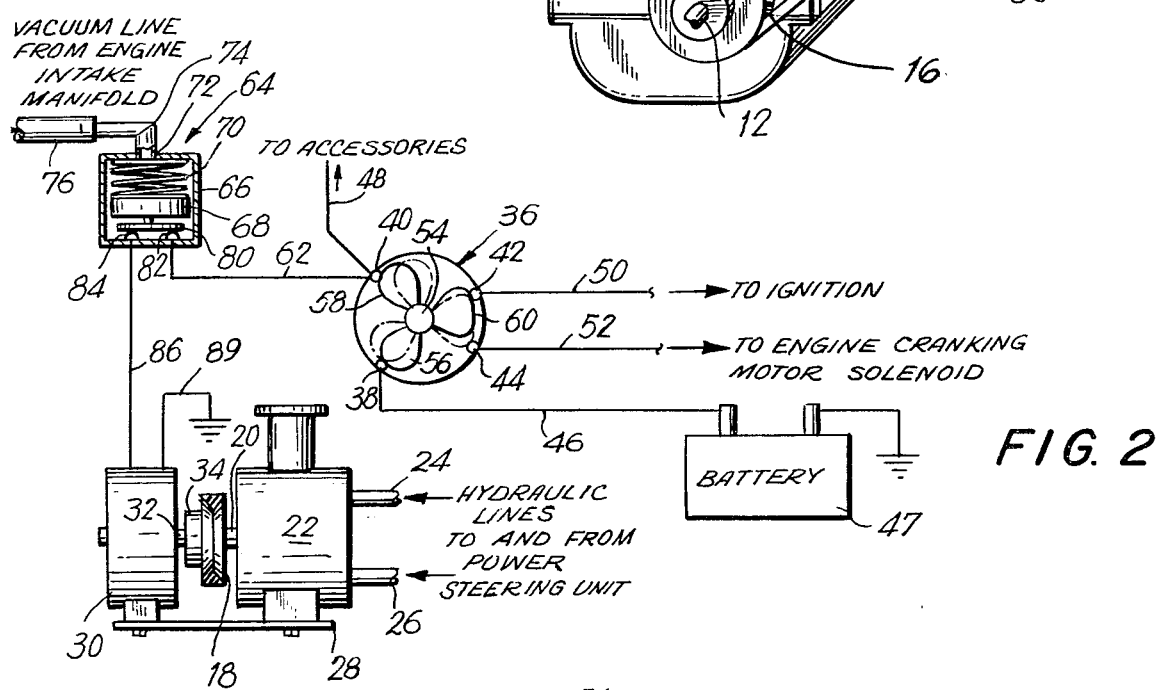
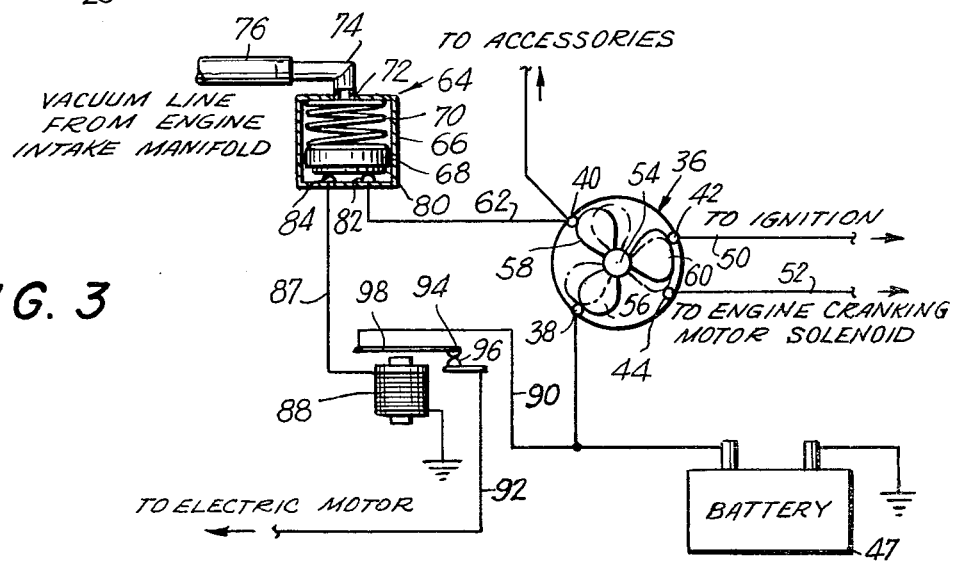

POWER STEERING PUMP WITH AUXILIARY ELECTRIC MOTOR DRIVE

BACKGROUND OF THE INVENTION

1. Field of the Invention

Power steering hydraulic pump with auxiliary electric motor drive.

2. Description of the Prior Art

The majority of nearly all motor vehicles nowadays are equipped with a power steering mechanism. The reason for this is that with the aid of power steering it is very easy to turn the steering wheel to control the direction of movement of the motor vehicle. This is particularly true when the motor vehicle is moving at low speeds such as during parking. This problem is a particularly serious one for women many of whom find it exceedingly difficult and even dangerous to drive a motor vehicle without power steering.

On all motor vehicles with power steering units the power steering pump is belt driven by a drive pulley secured to the section of the crank shaft extending from the engine. If the motor vehicle engine should stall, the engine crank shaft no longer rotates so that the power steering pump does not generate pressurized fluid for the power steering unit. An inoperative power steering unit restricts the turning of the steering wheel which compounds the problems of being able to turn the steering wheel. This is extremely dangerous and can cause serious accidents. As an example, if the engine stalls while the steering wheel is rotated to a position such that the motor vehicle is making a turn, then it may be difficult for the motor vehicle operator to change the direction of movement of the motor vehicle as the motor vehicle completes its turn so that an accident will result.

SUMMARY OF THE INVENTION

1. Purposes of the Invention

It is an object of the present invention to provide an improved power steering system for a motor vehicle.

Still another object of the present invention is to provide an improved power steering system for a motor vehicle wherein said system is operative even if the motor vehicle engine is not running, as when stalled.

Other objects of the present invention in part will be obvious and in part will be pointed out hereinafter.

2. Brief Description of the Invention

According to the present invention the foregoing as well as other objects are achieved by providing an electric motor which drives the power steering pump when the motor vehicle engine is not running as when stalled and the ignition remains on. The electric motor is connected to the motor vehicle power steering pump drive shaft. A clutch is connected to a first pulley which is driven by a belt from a second pulley and said clutch is also connected to the power steering pump shaft. The second pulley is driven by the motor vehicle crank shaft. The ignition system of the motor vehicle includes an accessories contact terminal which is connected to the motor vehicle battery when the ignition is turned on. The accessories contact terminal is connected to a vacuum switch. The vacuum switch is closed only upon the motor vehicle engine internal manifold being above a certain pressure as when the engine is not running (stalled). When the engine is running the vacuum in the intake manifold maintains the vacuum switch open. The electric motor is connected to the vacuum switch and to ground.

In normal operation with the motor vehicle engine running, the second pulley belt drives the first pulley causing the power steering pump to operate. Consequently, the power steering pump generates pressurized fluid for the power steering unit. Since the motor vehicle engine is running the intake manifold causes the vacuum switch to be open so that there is no electrical potential supplied to the electric motor.

If the motor vehicle engine should stall with the ignition on the vacuum in the intake manifold will no longer keep the vacuum switch open and said switch will close. Consequently, the accessories contact terminal, which is in circuit with the motor vehicle battery when the ignition is on, will be connected to the electric motor causing the output shaft thereof to rotate driving the power steering pump. The power steering pump will generate fluid for the power steering unit so that the direction of the motor vehicle can be controlled despite the fact that the motor vehicle engine is not operating.

By having the vacuum switch connected to the accessories terminal instead of the ignition on terminal there is no drain on the battery during engine cranking.

If the ignition is turned off, the accessories contact terminal is no longer in circuit with the motor vehicle battery and the electric motor is no longer supplied with electrical energy so that there will not be a drain on the motor vehicle battery when the ignition is off.

The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the drawings wherein like parts in the different Figures are identified by the same reference numeral:

FIG. 1 is a perspective view of the power steering pump system of the present invention;

FIG. 2 is an illustration of the control means for the electric auxiliary motor utilized in the present invention;

FIG. 3 is an illustration of an alternate form of controlling the electric motor utilized in the present invention.

DESCRIPTION OF THE PREFERRED EMBODIMENTS

Figure 4:
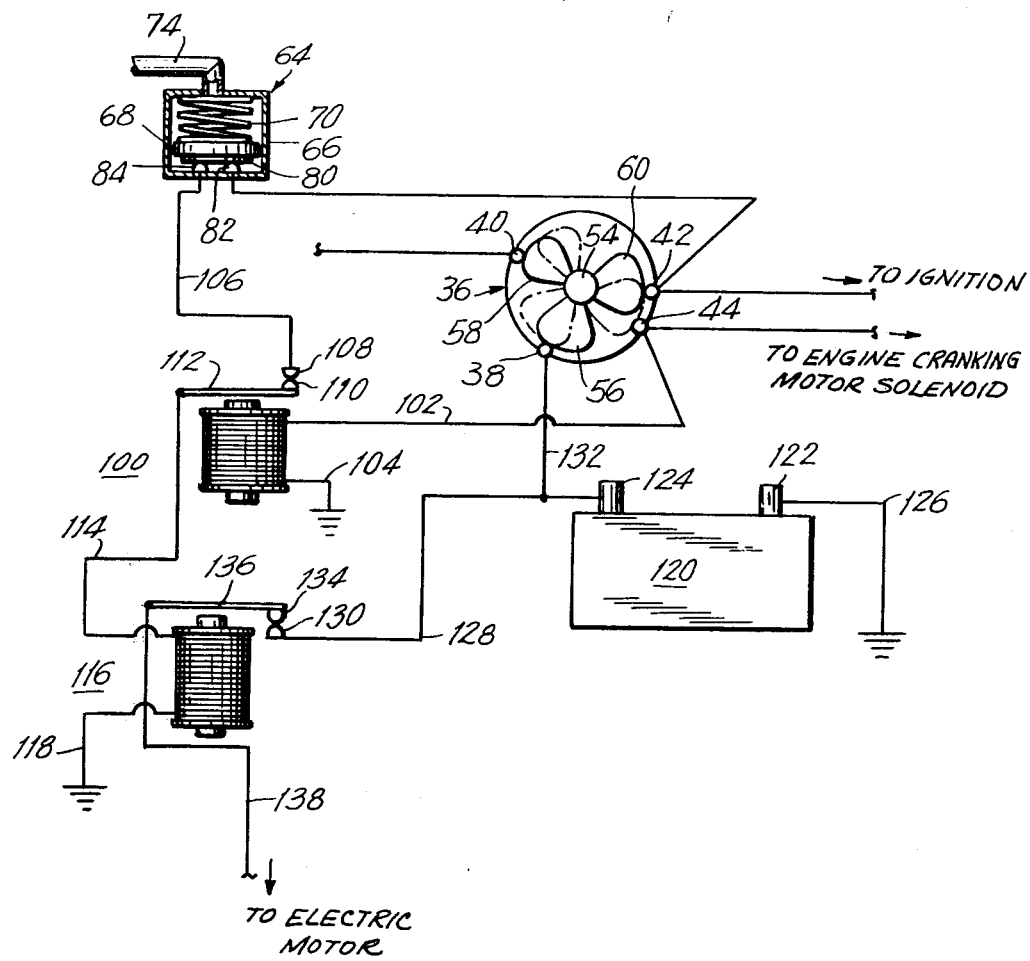
FIG. 4 is a schematic illustration of circuit means utilized in the present invention.

In the first Figure of the drawings a motor vehicle engine 10 is shown which is of conventional construction. Motor vehicle engine 10 includes an engine crank shaft 12 which drives, inter alia, a pulley 14. A belt 16 is trained about pulley 14 and about a further pulley 18. Pulley 18 upon being rotated drives shaft 20 of the power steering pump 22 as will hereinafter be described. Power steering pump 22 is connected to lines 24 and 26 which are connected to the power steering unit.

Power steering pump 22 is mounted on a bracket 28 as is an electric motor 30. Electric motor 30 includes an output shaft 32 which is connected to shaft 20. A clutch 34 is connected to shaft 20 and pulley 18.

An ignition switch 36 includes terminals 38, 40, 42 and 44. A wire 46 is connected at one end to the hot terminal of a motor vehicle storage battery 47 and at the other end to terminal 38 of said ignition switch.

A wire 48 is connected to terminal 40 and to the motor vehicle accessories. Terminal 40 is the accessories terminal. Terminal 42 is the "ignition on" contact terminal and is connected by a wire 50 to the engine ignition system. Terminal 44 is the engine cranking motor solenoid terminal and is connected by wire 52 to the engine cranking motor solenoid. The ignition system 54 includes integral conducting sections 56, 58 and 60 which operate as will hereinafter be described. A wire 62 connects terminal 40 to a vacuum switch 64.

Vacuum switch 64 includes a cylinder 66 within which is housed a piston 68. A compression spring 70 is located in cylinder 66 and acts against piston 68 as will hereinafter be described. A port 72 is located in cylinder 66 and is connected to a tube 74. Tube 74 is connected to a conduit 76 which conduit in turn is connected to the engine intake manifold 78. Movable with piston 66 is a bridge 80. Located at the end of cylinder 66 furthest from port 72 are terminals 82 and 84. Bridge 80 is designed so that in the lowermost position thereof said bridge contacts terminals 82 and 84 and inasmuch as the bridge is made from a conductive material said terminals are placed in circuit with each other. A wire 86 connects terminal 84 to electric motor 30 and a wire 89 grounds said electric motor.

To start the motor vehicle engine 10 the ignition key is rotated so that section 60 abuts terminals 42 and 44 placing the battery in circuit with the cranking motor solenoid. Section 58 does not contact terminal 40 while section 56 contacts terminal 38 (see dotted line structure of ignition switch in FIG. 2). After motor vehicle engine 10 starts the ignition key is released so that section 58 contacts terminal 40 and section 60 contacts only terminal 42 while section 56 contacts terminal 38 (see solid line structure of ignition switch in FIG. 2).

With the motor vehicle engine operating crank shaft 12 drives pulley 14 and via belt 16 pulley 18. Rotation of pulley 18 results in rotation of shaft 20 via clutch 34 which is engaged causing power steering pump 22 to operate. Shaft 32 is rotated when shaft 20 is rotated. However, this involves relatively no work since the electric motor is not energized. This is because with the engine operating the vacuum from the intake manifold causes piston 68 to overcome the bias of spring 70 so that bridge 80 does not contact terminals 82 and 84.

If the motor vehicle engine should stall crank shaft 12 will no longer rotate. However, with the ignition key in the ignition on position, i.e., so that section 58 contacts terminal 40, section 60 contacts terminal 42 and section 58 contacts terminal 38 the motor vehicle storage battery will be connected to terminal 40. Inasmuch as the vacuum from the intake manifold will no longer be available to overcome the bias of spring 70 bridge 80 will contact terminals 82 and 84 so that electrical energy from the battery via wire 46, terminal 38, wire 62, terminal 82, bridge 80, terminal 84, and wire 86 will be directed to motor 30 causing said motor to operate. Consequently, output shaft 32 thereof will rotate shaft 20 causing the power steering pump to generate fluid so that the power steering system will be operative even though the motor vehicle engine is stalled. This will enable a person to safely control the direction of movement of the motor vehicle. While shaft 32 is rotating shaft 20 pulley 18 is not rotated as the clutch is not engaged.

It is to be appreciated that by turning the ignition off i.e. so the ignition key is positioned so that section 56 does not contact terminal 38 there will be no electrical energy directed to motor vehicle storage battery will not be drained when the ignition is off.

If desired, a clutch may be used on shaft 32. Still further, motor 30 can be fluid, electrically or otherwise coupled to shaft 20 as desired. Motor 30 can be positioned as desired.

It may be desirable to include a relay as shown in FIG. 3 so that the amount of current going through the vacuum switch is minimized. In FIG. 3, terminal 84 is connected by a wire 87 to a relay 88. Wire 90 is connected to the hot terminal of the motor vehicle storage battery and to relay contact arm 98. Wire 92 is connected to electric motor 30. Relay 88 includes terminals 94 and 96 which are placed in contact with each other when electrical energy is supplied to relay 88 via wire 87. At all other times terminals 94 and 96 are spaced apart from each other.

The embodiment of FIG. 3 is identical to the embodiment of FIGS. 1 and 2 except that the embodiment of FIG. 3 includes a relay minimizing the amount of current flowing through the vacuum switch and the accessories terminal.

In FIG. 4 of the drawings a circuit is illustrated which prevents auxiliary motor 30 from receiving electric current during engine cranking thereby minimizing the drain upon the battery during cranking as well as minimizing the current flowing through the ignition switch. A first relay 100 is provided. A wire 102 is connected to engine cranking solenoid terminal 44 and to the solenoid of relay 100. A wire 104 connects the solenoid of relay 100 to ground. A wire 106 is connected to terminal 84 and to terminal 108. Terminal 110 cooperates with terminal 108 and is connected to conducting arm 112. A wire 114 is connected to conducting arm 112 and to the solenoid of a second relay 116. A wire 118 connects the solenoid of relay 116 to ground.

Battery 120 includes posts 122 and 124. A wire 126 connects post 122 to ground. A wire 128 connects post 124 to terminal 130. A wire 132 connects wire 128 to terminal 38. A terminal 134 cooperates with terminal 130 and is secured to conducting arm 136. A wire 138 is connected to conducting arm 136 and to auxiliary motor 30.

Solenoid 100 is open (terminals 108 and 110 are spaced from each other) during engine cranking when wire 102 directs electric current to the solenoid of relay 100. When wire 102 does not direct electric current to the solenoid of relay 100 terminals 108 and 110 contact each other and the relay is closed. Relay 116 is closed when current is directed via wire 114 to the solenoid of said relay. When relay 116 is closed terminals 130 and 134 contact each other. Absent wire 114 directing electric current to the solenoid of relay 116 said relay is open, i.e. terminals 130 and 134 are spaced apart from each other.

In normal use the ignition will be in the ignition on condition so that electrical energy will be directed to terminal 42 and not terminal 44. Consequently, relay 100 will be closed. If the engine should stall vacuum switch 64 will close so that terminals 82 and 84 are in circuit with each other. Current will be directed from terminal 42 through the vacuum switch and through relay 100 to relay 116 so that said relay 116 will close placing terminals 130 and 134 in contact with each other. As a consequence, electrical current from battery 120 will be directed to auxiliary motor 30. Electrical current will be supplied to relay 116 only when vacuum switch 64 is closed which occurs only when the ignition is on and the engine is not operating, as when stalled.

It can thus be appreciated that during engine cranking relay 100 is open so that there is no drain on the battery during engine cranking.

It thus will be seen that there are provided power steering hydraulic pump with auxiliary electric motor drive systems which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. A power steering system for a motor vehicle comprising a motor vehicle engine including an engine crank shaft and in intake manifold, an engine ignition system including an ignition lever having an ignition "on" position and "off" position, a power steering unit, a power steering pump for driving said power steering unit, means for driving said power steering pump from said engine crank shaft when said motor vehicle engine is operating and said ignition lever is in the ignition on position, a source of electrical energy connected to said ignition lever when said ignition lever is in the ignition on position, an auxiliary electric motor for driving said power steering pump when energized by said source of electrical energy, a vacuum switch having an open and a closed condition, said vacuum switch being in circuit with said source of electrical energy, said auxiliary electric motor and said ignition lever when said ignition lever is in the ignition on position, said vacuum switch being connected to said intake manifold and being responsive to the pressure in said intake manifold, said vacuum switch being urged into the open condition when the pressure in said intake manifold is below a predetermined level as when the motor vehicle engine is operating to prevent said auxiliary electric motor from being energized by said source of electrical energy and being biased into the closed condition when the pressure in said intake manifold is above a predetermined level as when said motor vehicle engine is not operating to thereby permit said source of electrical energy to energize said auxiliary electric motor to operate said power steering pump.

* * * * *